United States Patent [19]

Meisinger et al.

[11] Patent Number: 4,688,830
[45] Date of Patent: Aug. 25, 1987

[54] EXTERNALLY THREADED QUICK CONNECT COUPLING HAVING INTEGRAL FLUID PRESSURE ASSISTED SEAL

[75] Inventors: Stanlee W. Meisinger, Brooklyn Center; Daniel P. Welch, Eden Prairie, both of Minn.

[73] Assignee: FasTest, Inc., St. Paul, Minn.

[21] Appl. No.: 872,119

[22] Filed: Jun. 9, 1986

[51] Int. Cl.⁴ ............................................. F16L 17/00
[52] U.S. Cl. .................... 285/100; 285/106; 285/220; 285/281; 285/901; 138/89
[58] Field of Search ............... 285/100, 101, 95, 901, 285/900, 106, 220, 219; 138/89; 220/240

[56] References Cited

U.S. PATENT DOCUMENTS

| Re. 23,137 | 7/1949 | Hobbs . | |
|---|---|---|---|
| 418,225 | 12/1889 | Rice . | |
| 1,896,062 | 2/1933 | Berry . | |
| 2,485,976 | 10/1949 | Main | 285/106 |
| 2,494,598 | 1/1950 | Waring | 285/95 X |
| 2,689,754 | 9/1954 | Dunton | 285/101 X |
| 2,703,720 | 3/1955 | Warren | 285/95 X |
| 2,712,458 | 7/1955 | Lipson . | |
| 2,819,733 | 1/1958 | Maisch | 285/902 X |
| 3,291,442 | 12/1966 | Cranage | 285/101 X |
| 3,377,028 | 4/1968 | Bruggeman . | |
| 3,724,879 | 4/1973 | Snyder . | |
| 3,727,952 | 4/1973 | Richardson . | |
| 3,771,817 | 11/1973 | Schnabel . | |
| 3,841,670 | 10/1974 | Bottoms | 285/101 |
| 4,042,020 | 8/1977 | Wellstein | 285/220 X |
| 4,129,145 | 12/1978 | Wynn . | |
| 4,261,601 | 4/1981 | Sloan . | |
| 4,345,783 | 8/1982 | Bergstrand . | |
| 4,375,297 | 3/1983 | Persson . | |
| 4,527,817 | 7/1985 | Persson . | |
| 4,543,995 | 10/1985 | Weh et al. . | |
| 4,589,689 | 5/1986 | Regan | 285/101 X |

FOREIGN PATENT DOCUMENTS

| 883689 | 7/1953 | Fed. Rep. of Germany | 220/240 |
|---|---|---|---|
| 1094055 | 12/1960 | Fed. Rep. of Germany | 285/220 |
| 1253297 | 1/1961 | France | 285/220 |
| 294756 | 8/1928 | United Kingdom | 138/89 |

Primary Examiner—Thomas F. Callaghan
Attorney, Agent, or Firm—Merchant, Gould, Smith, Edell, Welter & Schmidt

[57] ABSTRACT

A quick connect coupling (20) for fluid tight connection to a threaded fluid port (22). A body (26) of the quick connect coupling (20) having a cylindrical, externally threaded first end (28) defining an axially extending passage (29) into the coupling body (26). Axially slidable sleeve (42) being mounted on the outside of the coupling body (26) for slidable motion between a seal unassisted position and a seal assisted position, the axially slidable sleeve (42) forcing against an elastomeric seal (30) in the seal assisted position so as to provide a fluid tight seal between an end of the fluid port (22) and the coupling (20).

9 Claims, 6 Drawing Figures

EXTERNALLY THREADED QUICK CONNECT COUPLING HAVING INTEGRAL FLUID PRESSURE ASSISTED SEAL

BACKGROUND OF THE INVENTION

The present invention relates to a coupling for use with pressurized fluid systems. More particularly, the present invention relates to an externally threaded quick connect coupling having integral fluid pressure assisted seal.

Current methods for attaching fluid lines and plugging threaded fluid ports generally include a sealing arrangement requiring a wrenching operation to ensure an adequate seal. The sealing arrangement typically involves metal interference of mating parts, sealants, or elastomeric seals. The wrenching operation is required in order to complete the sealing process, or at least prevent the sealing arrangement from being overcome by fluid pressure in the fluid ports. This is time consuming and often cumbersome to accomplish.

Several attempts have been made at developing quick connect couplings utilizing fluid pressure actuated seals. See for example, U.S. Pat. Nos. 4,345,783; 4,375,297; 4,527,817; and 4,543,995. However, these couplings, while enabling a quick connection to occur, are rather cumbersome and have a relatively large coupling body making them difficult, if not impossible, to use in difficult to get at areas, or where there is reduced space availability.

Additionally, the above mentioned first three patents utilize a separate actuating fluid port for delivery of an actuating fluid which adds to their bulkiness and complicated nature. Additionally, the above mentioned fourth patent, which utilizes mechnical jaws pressed together in one position and spread apart in another position, is more complicated than that of the present invention.

U.S. Pat. No. 3,291,442 discloses a rather complicated gas or vacuum-operated coupling including a sleeve and plug slidably mounted on/in the coupling body and which are moved by gas pressure.

The present invention solves these and many other problems associated with currently available coupling devices.

SUMMARY OW THE INVENTION

The present invention relates to an externally threaded quick connect coupling having an integral fluid pressure assisted seal for fluid tight connection to a threaded fluid port. The quick connect coupling includes a body having a cylindrical externally threaded first end. The first end defines a passage extending axially into the body. Elastomeric seal means circumferentially surrounds the externally threaded first end for abutting an end of the fluid port upon threading the first end into the fluid port. A sleeve is mounted on the coupling body for axially slidable movement between an unassisted seal position and a pressure assisted seal position. A first end of the sleeve includes shoulder means for engaging the elastomeric seal means in the pressure assisted seal position. An opposite second end of the sleeve abuts against shoulder means of the coupling body for retaining the sleeve on the coupling body. The axially slidable sleeve and the coupling body cooperate to define a cavity there between. A radially extending passage extends from the axially extending passage to the cavity. The axially slidable sleeve and the coupling body cooperate to cause an unbalanced force on the sleeve when subjected to fluid pressure, the resultant net force on the sleeve being axially directed in the direction of the fluid port, whereby entrance of fluid under pressure from the fluid port into the coupling body causes the sleeve to move forward into engagement with the elastomeric seal means thereby forcing the elastomeric seal means against an end of the fluid port so as to form a fluid tight seal. Secondary seal means proximate the second end of the sleeve is present for providing a fluid tight seal between the sleeve and the coupling body.

The present invention does away with the necessity of applying sealants, metal interferences and mechnically assisted wrenching even where very high pressure may be encountered in a fluid system. This is accomplished by providing "unbalanced" sealing means such that as the system fluid pressure is increased, the sealing effect is increased. This is as opposed to a conventional seal arrangement wherein seal arrangements have a tendency to separate as the pressure is increased.

In the present invention, the sleeve and coupling body cooperate to provide the axially slidable sleeve with unequal opposing cross-sectional surface areas transverse to the axis of the coupling which are subjected to the system fluid pressure thereby resulting in a net force being exerted by the fluid pressure on the sleeve in the direction of the fluid port. The sleeve is thus "unbalanced" in a fluid pressure environment in that the axially opposing forces acting on the sleeve are not equal or "balanced". As system fluid pressure is introduced into the connector, the elastomeric seal of the connector body is forced against the end of the fluid port by the axially slidable sleeve moving toward the fluid port. This eliminates the need for mechanical wrenching which would be required to prevent separation of the connector from the fluid port. Wear and other damage to the elastomeric seal are minimized because rubbing contact and distortion due to wrenching are eliminated.

The present invention provides a sleeve slidably mounted on the coupling body and having a surface subjected to the fluid pressure in the passageway of the coupling body which tends to move the sleeve to a pressure assisted seal position. The sleeve and coupling body cooperate such that the sleeve is actuated automatically to the pressure assisted seal position upon introduction of fluid pressure into the coupling.

In the preferred embodiment, as system fluid pressure is introduced into the connector, an end of the axially slidable sleeve is forced against the end of the fluid port so as to provide a mechanical barrier preventing extrusion of the elastomeric seal from between the end of the fluid port and the sleeve.

The present invention can be utilized with extremely high pressure fluid systems, particularly viscous fluid system, since it incorporates a threaded end thereby assuring that the connector will not be pulled out of the fluid port as the pressure is increased. The threads provide a mechanical connection which will withstand the extremely high pressures.

The present invention also provides a quick connect coupling which can be hand threaded onto a fluid port or the like and does not require any mechanically assisted wrenching. Accordingly, the present invention provides for a very quick interconnection.

Unlike the first three above mentioned patents, the present invention utilizes the fluid pressure of the system wherein it is being used to provide the pressure assisted sealing function. The above referenced first three patents utilize a separate actuating fluid passageway which increases their complexity and enlarges the size of the coupling body. The present invention obtains a very desirable ratio between fluid passageway diameter and overall housing size enabling it to be utilized in locations where there are severe space constraints.

Additionally, the principles of the present invention may be used in a connector providing for flowthrough of the fluid under pressure as well as in plugs utilized to close the end of the fluid port. Additionally, there are several other numerous applications wherein the principles of the present invention can be applied.

Another advantage of the present invention is that it provides a fluid line connector with a relatively large, straight fluid flow path so as to minimize the flow restriction and flow turbulence which might otherwise be objectionable.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF A PREFERRED EMBODIMENT

Figure 1:
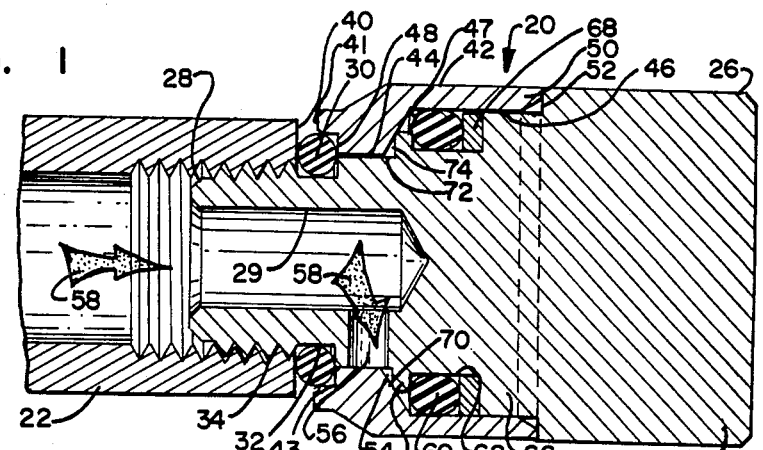
FIG. 1 is a sectional view of an embodiment of a plug connector utilizing the principles of the present invention, the plug connector being in an unassisted seal state.
Figure 2:
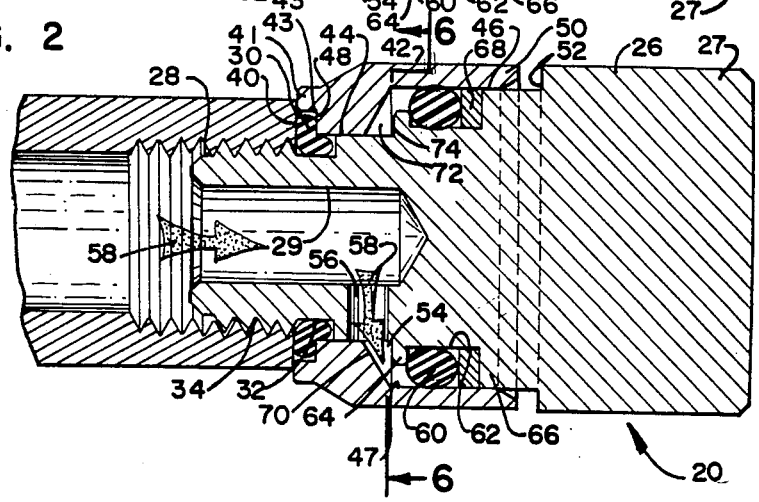
FIG. 2. is a view similar to that of FIG. 1 with the plug connector being in a pressure assisted seal state.
Figure 6:
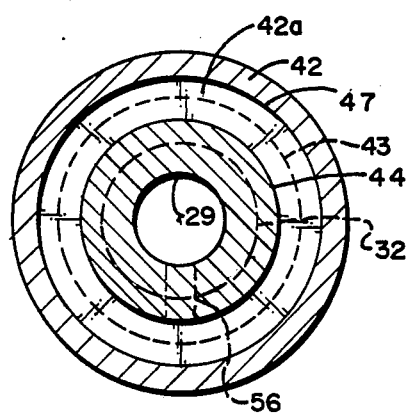
FIG. 6 is a sectional view as seen generally along line 6—6 of FIG. 2.

Illustrated in FIGS. 1 and 2 is an embodiment of a quick connect coupling 20 in accordance with the principles of the present invention. The quick connect coupling 20 illustrated in FIGS. 1 and 2 is being utilized to plug the end of a fluid port 22 in a pressurized fluid system. It will be appreciated that the present invention might be utilized with any number of different components in a pressurized fluid system and should not be limited to the specific embodiments disclosed in this application. For example, the present invention might be used with hydraulic systems, containers, valves, fluid lines, etc. The quick connect coupling has a body 26 including a cylindrical, externally threaded first end 28 of lesser diameter than a solid first end 27 of the body 26. The externally threaded first end 28 defines a passage 29 extending axially into the body 26. An elastomeric seal 30, such as an O-ring, is positioned in a groove 32 of the coupling body 26 adjacent threads 34 of the threaded first end. Upon threading the coupling body 26 into the fluid port 22 the elastomeric seal 30 will abut an end 40 of the fluid port 22. A reciprocally axially slidable sleeve 42 is slidably mounted on a first cylindrical portion 44 of the coupling body 26 and a greater diameter second cylindrical portion 46 of the coupling body 26 for axially slidable movement between an unassisted seal position as illustrated in FIG. 1 wherein the system pressure is not assisting in formation of the seal with the fluid port 26, and a pressure assisted seal position wherein an interior shoulder portion 48 of the sleeve 42 engages the elastomeric seal 30 and forces the same against the end 40 of the fluid port 22 so as to assist in formation of the seal between the quick connect coupling 20 and the fluid port 22 as generally illustrated in FIG. 2. Additionally, in the embodiment shown, a first end 41 of the sleeve 42 is forced against the end 40 of the fluid port 22 so as to cooperate with the end 40 of the fluid port 22 to provide a mechanical barrier preventing extrusion of the seal 30 from between the end 40 of the fluid port 22 and the first end 41 of the sleeve 42. The sleeve 42 includes an opposite second end 50 cooperating with a shoulder portion 52 of the coupling body 26 for maintaining the sleeve 42 on the coupling body 26. A cavity 54 is defined between the axially slidable sleeve 42 and the coupling body 26. A radially extending passage 56 interconnects the axially extending passage 29 to the cavity 54 for delivery of the fluid under pressure as indicated by the arrows 58 from the fluid port 22 into the cavity 54. Delivery of the fluid under pressure causes the sleeve 42 to move forward into engagement with the elastomeric seal 30. This is due to the fact that an unequal or "unbalanced" force acting on the sleeve is caused by the sleeve 48 being a greater cross sectional area transverse to the axis of the coupling facing the end 26 of the coupling which is subjected to fluid pressure than that facing the end 40 of the fluid port 22. In the embodiment shown, and as illustrated in FIG. 6, this difference in cross sectional surface area is the difference in cross sectional surface area between a bore 47 of the sleeve 42 which slides on the cylindrical portion 46 and a bore 43 of the end 41 of sleeve 42 wherein the elastomeric seal 30 is positioned. The net force generated is $P \times dA$ where P represents fluid pressure and dA represents the difference in cross sectional surface area.

An elastomeric seal 60 is retained in a groove 62 circumferentially about the coupling body 26 between shoulder portions 64 and 66. In systems having extremely high operating pressures, a cylindrical backup ring 68 might be positioned between the elastomeric seal 60 and the shoulder portion 66 of the coupling body 26. Under extremely high system fluid pressures, the ring 68 will expand and cooperate with the sleeve 42 to provide a barrier preventing extrusion of the seal 60 between the sleeve 42 and the coupling body 26. The body 26 and the sleeve 42 might be made of metal. The backup ring 68 might be made of plastic or a Teflon TM material.

In the specific embodiment of the quick connect coupling shown, the cavity 54 circumferentially surrounding the coupling is formed by a diagonally extending surface 70 of the sleeve 42 and axially extending and radially extending surfaces 72,74 of the coupling body 26, although it might be formed in any number of different ways.

As illustrated in FIG. 2, the fluid under pressure forces the sleeve 42 forward such that it engages and deforms the elastomeric seal 30 and abuts against the end 40 of the fluid port 22.

Figure 3:
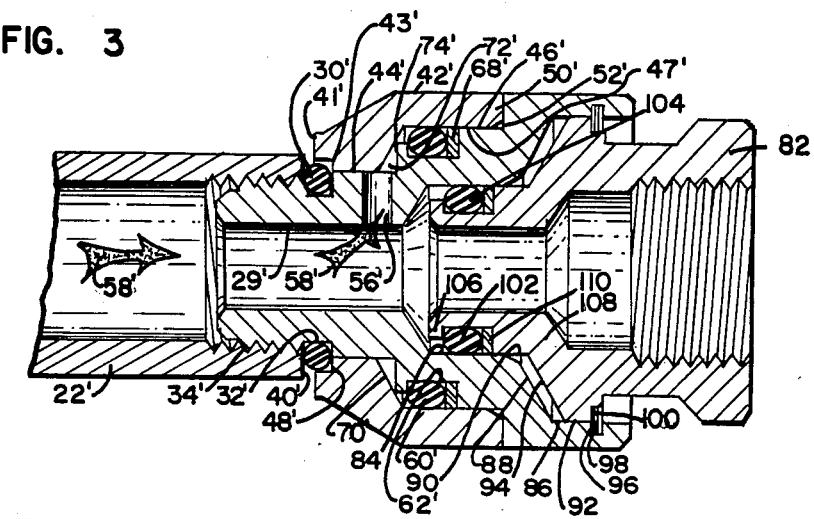
FIG. 3 is a sectional view of an embodiment of a swivel connector in accordance with the principles of the present invention providing for flowthrough of the pressurized fluid, the connector being shown in an unassisted seal state.
Figure 4:
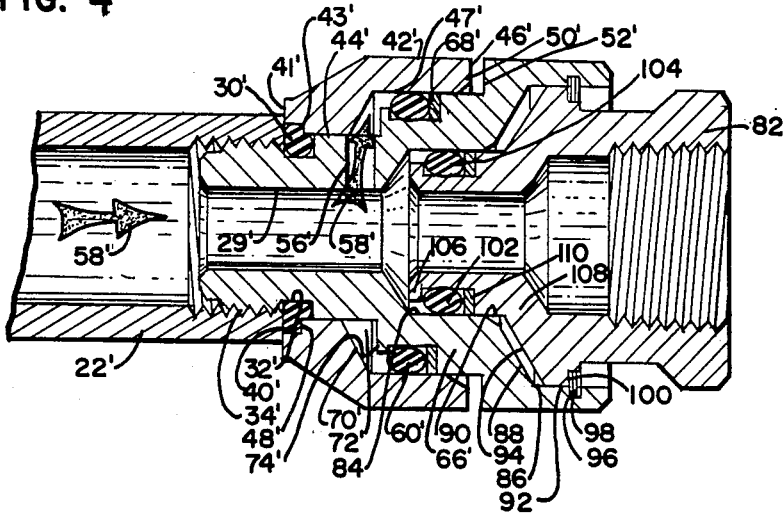
FIG. 4 is a view similar to that of FIG. 3 showing the connector in a pressure assisted seal state.

Illustrated in FIGS. 3 and 4 is an embodiment of a connector in accordance with the principles of the present invention which provides for flowthrough of the fluid under pressure. In this embodiment, parts corresponding to those of the embodiment shown in FIGS. 1 and 2 are primed. As opposed to a solid end portion 27 of the coupling body 26, the coupling body 26' includes an internally threaded fitting 82 mounted in the coupling body 26' for swivel motion relative thereto and for interconnection to a fluid line (not shown) such as a hose or the like. In this embodiment, the coupling body 26' defines first and second bores 84,86 interconnected by a diagonal surface 88. The fitting 82 includes corresponding cylindrical portions 90 and 92 interconnected by a diagonal surface 94 which are configured for reception in the bores 84,86 of the cylindrical body 26'. A retaining ring 96 mounted in a groove 98 of the coupling body 26' engages a shoulder portion 100 of the fitting 82 for retaining the fitting 82 in the connector body 26'. An elastomeric seal 102 positioned in a groove 104 of the fitting 82 between shoulder portions 106 and 108 provides a fluid tight seal between the fitting 82 and the cylindrical body 26'. In the embodiment shown, a backup ring 110 is present. The connector is illustrated in FIG. 3 in an unassisted seal position, and in FIG. 4 in a pressure assisted seal position, the sleeve 42' having been moved forward by the fluid pressure to engage the elastomeric seal 30' and about the end 40' of the fluid port 22'.

Figure 5:
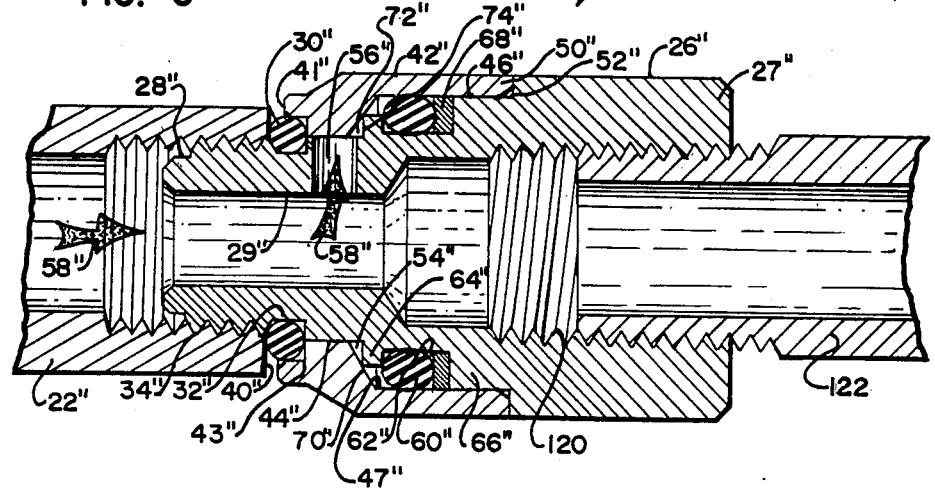
FIG. 5 is a sectional view of an embodiment of an extension coupling in accordance with the principles of the present invention, the extension coupling being illustrated in an unassisted seal state.

Illustrated in FIG. 5, is yet another application of the present invention. In this embodiment, the principles of the present invention are utilized to provide a coupling extension feature so as to facilitate access to difficult to reach locations in the pressurized fluid system. In this embodiment, parts corresponding to those of FIGS. 1 and 2 are doubled primed. In this application, the coupling body 26" includes a threaded bore portion 120 for receipt of a threaded extension member 122. In this embodiment, the extension member 122 might be mechanically wrenched into the coupling body 26" and suitable sealants supplied to prevent leakage between the coupling body 26" and the extension member 122. This embodiment is shown in the unassisted position; however, it will be appreciated that this embodiment functions in a similar fashion to that of the previous embodiments so as to provide a fluid pressure assisted sealing effect.

In use, the coupling body 26 is hand threaded into the fluid port 22 until the end 40 of the fluid port 22 engages the elastomeric seal 30. As fluid is introduced under pressure into the coupling body 26, illustrated by the arrows 58, the sleeve 42 moves axially toward the elastomeric seal 30 due to the net or unbalanced force caused by the pressure acting on the sleeve 42. Accordingly, sealing is accomplished without the use of any tools. The coupling can be readily disconnected upon removal of the fluid pressure.

It is to be understood that even though the above numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad, general meaning of the terms in which the appended claims are expressed.

What is claimed is:

1. A quick connect coupling for fluid tight connection to a threaded fluid port, comprising:
    (a) a coupling body, the coupling body having a cylindrical, externally threaded first end, the first end defining a passage extending axially into the coupling body from the first end;
    (b) elastomeric sealing means circumferentially surrounding the first end of the coupling body for abutting an end of the fluid port upon threading the first end into the fluid port;
    (c) external, axially slidable sleeve slidable between an unassisted seal position and a pressure assisted seal position, a first end of the sleeve including shoulder means for engaging the elastomeric seal means in the pressure assisted seal position, an opposite second end of the sleeve cooperating with retention means for retaining the sleeve on the coupling body; the axially slidable sleeve and the coupling body cooperating to define a cavity there between, passage means extending from the axially extending passage to the cavity for placing the cavity in fluid communication with the axially extending passage, the axially slidable sleeve and the coupling body further cooperating to cause an unbalanced force on the sleeve when subjected to fluid pressure, a resultant net force being axially directed on the sleeve in the direction of the fluid port, whereby entrance of fluid under pressure from the fluid port into the cavity forces the sleeve forward into engagement with the elastomeric seal means thereby forcing the elastomeric seal means against an end of the fluid port so as to form a fluid tight seal between the quick connector and the fluid port; and
    (e) secondary seal means proximate the second end of the sleeve for providing a fluid tight seal between the sleeve and the coupling body.

2. A quick connect coupling in accordance with claim 1, wherein the end of the sleeve abuts the end of the fluid port in the pressure assisted seal position, thereby providing a barrier preventing extrusion of the elastomeric sealing means between the end of the fluid port and the sleeve when the quick connect coupling is used with extremely high fluid pressures.

3. A quick connect coupling in accordance with claim 1, wherein the secondary seal means includes an expandable flat cylindrical backup seal and an elastomeric seal, the backup seal cooperating with the sleeve and the coupling body to prevent extrusion of the elastomeric seal between the sleeve and the coupling body.

4. A quick connect coupling in accordance with claim 1, wherein the elastomeric sealing means includes an O-ring member.

5. A quick connect coupling in accordance with claim 1, wherein a second end of the coupling body is enclosed whereby the quick connect coupling can be used to plug a threaded fluid port.

6. A quick connect coupling in accordance with claim 1, wherein the axially extending passage of the coupling body extends completely through the coupling body to provide for linear flowthrough of fluid.

7. A quick connect coupling in accordance with claim 1, wherein a second end of the coupling body includes extension means for extending the overall length of the coupling, whereby the coupling can be used in hard to get at locations.

8. A quick connect coupling for fluid tight connection to a threaded fluid port, comprising:
   (a) a coupling body, the coupling body having a cylindrical, externally threaded first end, the first end defining a passage extending axially into the coupling body from the first end;
   (b) elastomeric sealing means circumferentially surrounding the first end of the coupling body for abutting an end of the fluid port upon threading the first end of the coupling body into the fluid port;
   (c) a sleeve slidably mounted on and externally of the coupling body, the sleeve being capable of reciprocal movement between an unassisted sealed position and a pressure assisted seal position, a first end of the sleeve including shoulder means for engaging the elastomeric seal means in the pressure assisted seal position, an opposite second end of the sleeve cooperating with retention means for retaining the sleeve on the coupling body;
   (d) a cavity being defined between the coupling body and the sleeve;
   (e) passage means extending from the axially extending passage to the cavity for placing the cavity in fluid communication with the axially extending passageway;
   (f) the sleeve including a surface partially defining the cavity which is subjected to the force of the fluid pressure so as to force the sleeve to the pressure assisted seal position; and
   (g) secondary seal means proximate the second end of the sleeve for providing a fluid tight seal between the sleeve and the coupling body.

9. A quick connect coupling for fluid tight connection to a threaded fluid port, comprising:
   (a) a coupling body, the coupling body having an externally threaded first end and defining a passage extending axially into the coupling body from the first end;
   (b) sealing means disposed proximate a first end of the coupling body;
   (c) a sleeve externally mounted on the coupling body and slidable between an unassisted seal position and a pressure assisted seal position, the first end of the sleeve engaging the sealing means in the pressure assisted seal position and forcing the sealing means against an adjacent end of the fluid port to provide a fluid tight seal between the fluid port and the quick connect coupling;
   (d) the axially slidable sleeve and the coupling body cooperating to define a cavity therebetween;
   (e) passage means extending from the axially extending passage of the coupling body to the cavity for placing the cavity in fluid communication with the axially extending passage;
   (f) the sleeve including a surface partially defining the cavity which is subjected to the pressure of the fluid; and
   (g) secondary seal means proximate the second end or the sleeve for providing a fluid tight seal between the sleeve and the coupling body.

* * * * *

UNITED STATES PATENT AND TRADEMARK OFFICE
CERTIFICATE OF CORRECTION

PATENT NO. : 4,688,830

DATED : August 25, 1987

INVENTOR(S) : Stanlee W. Meisinger, et al.

It is certified that error appears in the above-identified patent and that said Letters Patent is hereby corrected as shown below:

Col. 1, line 47 (in the heading), delete "OW" and insert --OF--.

Col. 8, line 31, delete "or" and insert --of--.

Signed and Sealed this

Tenth Day of May, 1988

Attest:

DONALD J. QUIGG

Attesting Officer

Commissioner of Patents and Trademarks